May 13, 1930. G. BETHMANN ET AL 1,758,593
APPARATUS FOR THE TREATMENT OF A VISCOSE FILM
Filed June 18, 1928
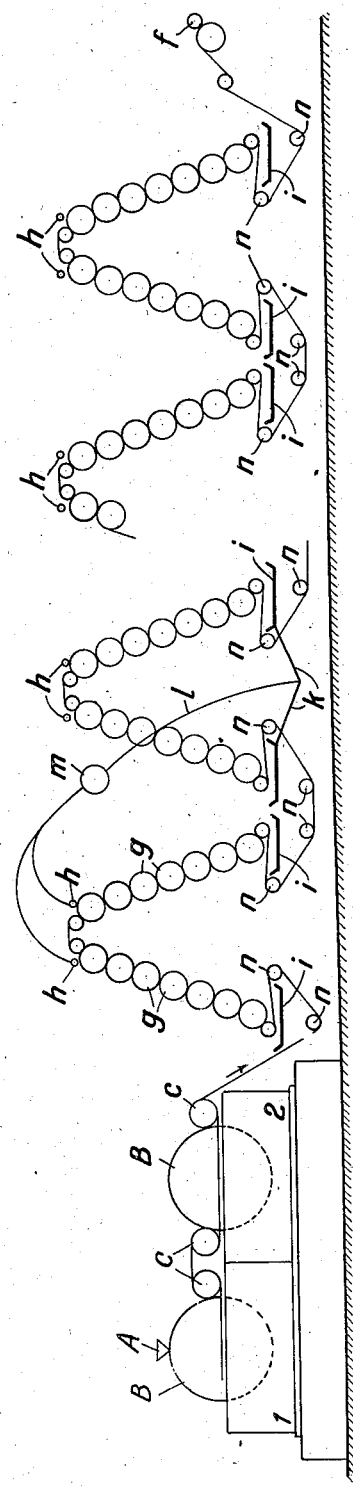

Patented May 13, 1930

1,758,593

UNITED STATES PATENT OFFICE

GUSTAV BETHMANN AND OTTO MUTHIG, OF JASENITZ, NEAR STETTIN, GERMANY, ASSIGNORS TO THE FIRM FELDMÜHLE, PAPIER- UND ZELLSTOFFWERKE AKTIENGESELLSCHAFT, OF SCHOLWIN, NEAR STETTIN, GERMANY

APPARATUS FOR THE TREATMENT OF A VISCOSE FILM

Application filed June 18, 1928, Serial No. 286,456, and in Germany May 10, 1927.

For the finishing of a viscous film coming from the precipitation bath, it is necessary to submit the film to successive treatment with a hardening, washing and bleaching liquid and if required also with a dyeing liquid. The treatment with the various liquids, in order to lead to satisfactory results, must take place in a very intensive manner. This results in a great consumption of the liquid if the treatment is effected in tanks filled with the liquids. The present invention relates to an apparatus which ensures a greater economy in the use of the treatment liquids, with a very thorough action of the liquids on the film.

To this end, according to this invention, the film, after it has left the coagulation tank is carried or guided in succession over systems of rising and descending rolls, and when so guided is brought in contact with irrigation jets of the treating liquids. The liquid trickling down along the film can be collected at the bottom end of each series of rolls and if required used for further irrigation after renewing or freshening it.

A construction of the new apparatus is diagrammatically illustrated by way of example in the accompanying drawing. According to the drawing, the formation of the film takes place in such a manner that a pouring device A delivers a uniform current of a viscose solution in a state of suitable aging, to a roll B which rotates in a tank 1 filled with a coagulating liquid such as, for instance, ammonia sulphate.

In order to render the treatment with the coagulation liquid more intensive, the film is delivered by the first roll B over transmission rolls $c$ to a second roll B which corresponds to the first roll B and also rotates in a tank 2 filled with the coagulation liquid. A transmission roll $c$ thereafter transmits the film to the rising and descending series of rolls which constitute the essential characteristic feature of the present invention.

The rolls constituting the series of rolls are marked $g$. The irrigation of each rising and descending series of rolls with the film guided on it, is effected by means of irrigation pipes $h$. Under each series of rolls is provided a collector vessel $i$ in which the irrigation liquid collects after descending the rolls $g$.

In the drawing, for the group of rolls nearest to the coagulation tanks, 1, 2 is shown an irrigation by means of the discharge liquid which trickles down from a group of rolls situated at a greater distance from the coagulation tank and collects in the corresponding collector tanks $i$. According to the drawing, these tanks $i$ situated at a greater distance, are therefore provided with discharge pipes $k$ to which is connected a pipe $l$ in which is mounted a pump $m$ which draws the liquid from the tanks $i$ and delivers it to the sprayer pipes $h$ of the group of rolls nearest tanks 1 and 2. In the same way, each group of rolls nearer to the coagulation tank can be fed with the irrigation liquid of a group of rolls which is at a greater distance and belongs to the same kind, that is to say is to be irrigated with the same liquid. This kind of irrigation on the counter-current principle has for its result that the film sections, the treatment of which has progressed to the greatest extent, are irrigated with the fresh solution, owing to which their treatment is finished in a particularly efficacious manner.

As may be seen from the drawing, the irrigation of the film takes place during its passage over the rows of rolls only at one side at a time. This has special advantages for the reliable passage of the film throughout the systems of rolls, in as far as this produces a smoothing of the film side coming in contact with the rolls on the whole way through the apparatus, owing to which friction is diminished and owing to which also it becomes possible, without any risk of tearing or breaking, to allow a slip movement to take place between the rolls and the film, such as may be necessary in the case of an individual drive of the various groups of rolls for the purpose of adaptation to the irregular shrinking of the film in its various sections.

The carrying of the film throughout the whole series of the roll structures takes place with the use of guide rollers $n$. The film leaving the last group of rolls, is wound whilst still in moist state on a rod *f* preferably with the use of a friction drive.

What we claim is:

1. Apparatus for the treatment of a viscose film coming from the precipitation bath, comprising a plurality of obliquely arranged series of rolls adapted to guide a film alternately upward and downward in combination with liquid supply pipes for the irrigation of the film on its passage over the rolls in its downward and upward movement, each series of rolls comprising a plurality of rolls forming a substantially continuous row.

2. Apparatus according to claim 1, characterized by the series of rolls being alternately inclined in opposite directions, and by the liquid supply pipes being so arranged that the film passing over the rolls can be irrigated on the outer side.

3. Apparatus according to claim 1, characterized by the arrangement, under each row or rolls, of a liquid tank in which the irrigation liquid collects, in combination with means for feeding irrigation liquid collecting in one of such tanks situated at a greater distance from the precipitation bath to a series of rolls situated nearer to the precipitation bath.

In testimony whereof, we affix our signatures.

GUSTAV BETHMANN.
OTTO MUTHIG.